April 23, 1929.  M. O. TEETOR  1,710,388

PISTON AND PISTON RING

Filed Oct. 15, 1926  3 Sheets-Sheet 1

Witness
Martin H. Olsen.

Inventor
Macy O. Teetor
By Rector, Hibben, Davis & Macauley Attys.

Patented Apr. 23, 1929.

1,710,388

UNITED STATES PATENT OFFICE.

MACY O. TEETOR, OF HAGERSTOWN, INDIANA, ASSIGNOR TO THE PERFECT CIRCLE COMPANY, OF HAGERSTOWN, INDIANA, A CORPORATION OF INDIANA.

PISTON AND PISTON RING.

Application filed October 15, 1926. Serial No. 141,684.

My invention relates to piston and piston ring construction for use in cylinders of all forms of engines, pumps and the like, and has to do more particularly with means for providing and maintaining at all times and under all conditions of operation, a positive, uniform and highly effective seal between the piston and the wall of the cylinder in which it works to prevent the leakage of gas, oil, fluid pressure, etc. past the same. My invention is particularly adaptable for use in connection with internal combustion engines where maximum efficiency depends, in part, upon the efficiency of the seal between the piston and the wall of the cylinder. However, it is to be understood that my invention is not limited to such use, but may be used in any instance where a seal such as it provides is desired.

In ordinary piston construction, such as that used with internal combustion systems for automobiles, it is customary to employ the well-known split-rings, such rings being formed to a desired diameter with a certain degree of tension one ring being mounted in each of a plurality of ring grooves in the piston body. It is a well-known fact that these ordinary piston rings are not entirely satisfactory for several reasons.

This conventional ring is split for two reasons. First, the split makes it possible to install the ring in its groove by passing the same over the head of the piston; and second, the split provides a space in the ring for expansion due to heat. The ring casting is originally not round but is larger than the cylinder in which it is to be used so that it can be machined round and have a certain amount of tension in the cylinder when a segment is removed in the splitting of the ring, and the ring is compressed to its working diameter. Due to irregularities in casting and machining such a ring, the circularity and tension varies to a detrimental extent and an uncontrollable difference in performance is the result.

Due to the necessity of edge clearance of the ring in the grooves a certain amount of pressure from the compression chamber enters the space behind the ring and past the lower seat causing leakage. It is customary practice to employ several rings on a piston, and leakage from the cause just stated is diminished by the addition of each ring; however, the loss of a certain amount of pressure is inevitable. Because of the additional seal of each added ring the pressure which gets behind the lower rings is not as great as that which is behind the top ring or rings, and the pressure behind the particular ring depends upon the number of rings which are between it and the compression chamber. This uneven pressure exerted behind the rings assisted by the natural tension of the rings causes uneven and excessive wear of the cylinder walls and rings.

When these ordinary split type rings are used in an internal combustion engine the heat conditions existent in the cylinder affect the tension of such rings. The permanency of the tension may be considerably improved by individual casting of the rings and by hammering, but both methods have many disadvantages which are well known to those skilled in the art.

Furthermore, in the use of split rings, equal radial wall pressure has practically been attained as far as the mechanical construction of the ring is concerned, but the pressure exerted behind the ring when it is in operation inherently distorts this equal radial pressure on the cylinder wall because the ring is split on one side.

A cylinder is rarely exactly round because of inaccuracy in machining, heat conditions existent in operation and wear. Over a short arc the conventional or split ring is not flexible and will not readily conform to irregular curves of any kind. The horizontal movement of the connecting rod tends to wear a cylinder to an elliptical form, and when a cylinder is worn to a certain extent in this shape, and is out of round from any cause the split ring will not seal the obviously resulting opening or space between the cylinder wall and the piston.

Still further, these ordinary split rings are at all times floating in the piston groove due partly to clearance at the joint allowing sufficient pressure to pass which unseats the ring and permits equalization of such pressure on the top and bottom of the ring and there is at all times a film of oil between the side edges and the adjacent walls of the ring groove. As the piston moves in its cylinder, the ring is repeatedly moved to bring its side edges against the adjacent grooved walls with much force causing considerable wear on these side edges, and the ring becomes very loose in its groove which further adds to the leakage condition already referred to. This latter condition also sets up a situation wherein a ring is undesirably insulated from the piston body so that the conduction of heat from the piston to the cooler cylinder wall is hindered resulting in overheating of the piston and the well known objectionable results. This over-insulation results due to the fact that, as the side edges of the ring wear and permit a thicker film of oil to form between the ring edges and the grooves, an effective insulating medium is formed.

One of the objects of my invention is to provide a piston construction and piston ring construction adapted to overcome all of the foregoing disadvantages and objections and to provide for the desired efficient seal between the piston and cylinder wall at all times under all conditions of operation.

Another object is to provide a piston ring construction making it possible to machine the ring absolutely round in its natural working condition and without distorting its shape before or after finishing.

Still another object is to provide a piston construction embodying means for sealing the piston in its cylinder, such means being effective to provide the desired uniform seal at all times regardless of wear of the operating parts and regardless of whether the wear be regular or irregular.

A further object is to provide for more rigid, effective and positive conduction of heat from the piston head and body to the cylinder wall resulting in a more uniform heating and cooling of the operating parts.

An additional object is to provide a piston and piston ring construction wherein the piston ring in its assembled position is effective as a continued unsplit band of metal, and which is effectively controlled to maintain the desired efficient sealing engagement with the cylinder wall regardless of expansion of the operating parts, and without excessive frictional engagement therebetween. Still another object is to provide a piston construction wherein the sealing of the piston in the cylinder is directly under the control of the pressure conditions existent in the cylinder, so that a variable seal is provided, and whereby the effectiveness of the seal is variably increased or decreased upon a corresponding increase or decrease of fluid pressure above the piston in the cylinder.

Other objects are the provision of means for positively sealing the side edge of the ring against the adjacent groove surface regardless of side edge wear; to provide for the ready removal and replacement of rings; to provide a piston ring embodying means for reducing side edge wear, the arrangement being such that the side edge wearing surface of the ring is increased, without an increase of tension, weight, etc.; and to provide means for preventing the accumulation of carbon deposits around the rings.

Other objects and advantages will become apparent as this description progresses and by reference to the drawings which show my invention applied to a piston construction which may be used in connection with internal combustion engines for automobiles and wherein:

Fig. 2 is a vertical section taken on line 2—2 of Fig. 1 the lower portion of the piston being omitted.

Fig. 4 is a vertical sectional view taken on line 4—4 of Fig. 3, the lower portion of the piston being omitted.

Fig. 5 is a partial elevated view of the piston of the previous figures showing the rings applied to the ring and pressure space in the upper portion of the piston.

Figs. 6 and 7 show the opposite sides of one of the piston rings; or, since these rings are identical in all respects, Fig. 6 may be referred to as top plan view of the upper ring shown in Fig. 2, while Fig. 7 is a top plan view of the lower ring shown in such figure.

Fig. 6$^a$ is a partial sectional view taken on line 6$^a$—6$^a$ of Fig. 6 showing the construction of one of the pressure pads carried by such ring.

Fig. 6$^b$ is a view similar to Fig. 6$^a$ showing a modified form of pressure pad which may be employed.

Fig. 6$^c$ is an enlarged detail view of a modified form of means for aligning and connecting the ring parts together.

Figs. 11 and 12 show the opposite sides of one of the modified form of rings which is employed with this modified form of piston construction of Figs. 8 to 10 inclusive; and since these rings are identical in all respects Fig. 11 may be referred to as a top plan view of the upper ring shown in Fig. 9, while Fig. 12 is a top plan view of the lower ring of such figure.

Referring particularly to Figs. 1 to 7 inclusive of the drawings, the piston may comprise a body portion 1 supporting an integral head portion 2 by means of the centrally located post 3. The body portion 1 is provided with the ordinary inwardly extending bosses 3ª for carrying the usual piston pin which connects the piston to the connecting rod. The piston body may be formed of any desired and suitable metal to a diameter such as to allow for the ordinary standard clearance (say approximately .001 inch clearance for each inch of cylinder diameter) between the same and the cylinder wall surface. The head portion 2 is preferably formed to a diameter slightly less than the diameter of the body portion to allow sufficient clearance (say, for example, a clearance of .010 inch) between it and the cylinder wall surface. The purpose of this difference in diameters will be explained hereinafter.

The centrally disposed post 3, which is, preferably, integral with both the head and body portions, is of sufficient length to form a space 4 between these portions wide enough to snugly accommodate a plurality of superimposed piston rings which will be referred to more specifically hereinafter. The head portion 2 may be varied in thickness to suit the imposed working conditions in each specific instance without departing from my invention. The central post like portion 3, as well as the body portion 1, are formed hollow which, obviously, adds to lightness in construction, at the same time providing the desired strength and ruggedness in the piston construction as a whole.

The piston rings which are carried in the annular space 4 are maintained in the outer portion of such space when the piston is assembled in its cylinder, and this arrangement provides an annular pressure chamber behind the piston rings, such chamber having its outer walls formed by the piston rings which are expansible and contractible. Working pressure which is effective on the top of the piston is admitted to and also becomes effective in the ring and pressure space 4 through a series of openings 5 in the head portion 2 at its central part. Although, I have shown five of these openings, I do not desire to be limited to that specific number, nor to the size of the openings shown, since any desired number of openings may be employed, each of the desired size, to insure that the working pressure effective on the top of the piston will be effective, as desired, in the space 4 behind the ring.

Figures 2, 4, 5, 6, 6A, 6B, 6C, 7:
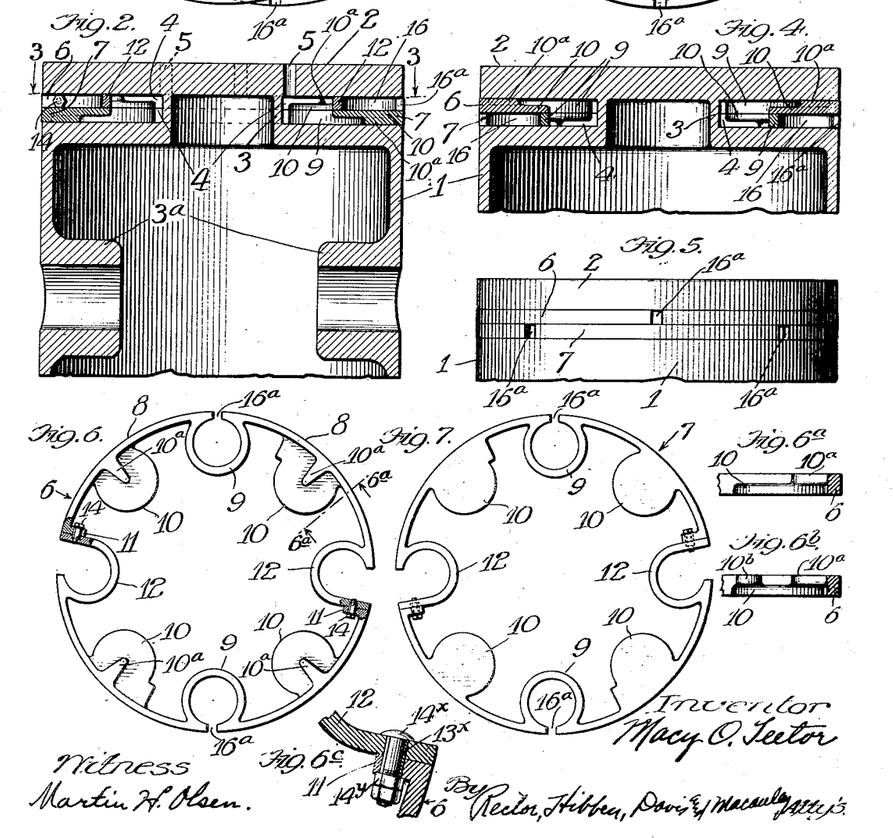

I employ two rings designated, respectively, 6 and 7 (see Fig. 2). These rings are adapted to fit in the space 4 in superimposed relation, the total clearance of the rings between the head and body portions being sufficient to permit the rings to readily move radially at all times and under all conditions without binding.

Each ring (see Figs. 6 and 7), preferably, comprises two semi-circular ring sections 70 which are adapted to be rigidly joined together to form, in assembled condition, a continuous band of metal which has a diameter slightly less (say approximately .00025 inch less) than the diameter of the cylinder in which it works and which has a thickness substantially equal to one-half the width of the space between the head portion 2 and the body portion 1. I do not desire to be limited to the relative dimensions hereinbefore set forth because it is obvious that the dimensions of the various parts may be varied without departing from my invention. The bearing face of each ring section is given the ordinary bearing finish, and this is also true of the side edges of the same. Each ring part is divided into a plurality of integrally joined segments 8, the joining together of the segments being accomplished by means of expansion loops or joints 9 between and integral with the adjacent ends of each segment. More specifically, this continuous section of the ring is looped inwardly at regular intervals to form a segmental bearing surface with an expansion joint or loop 9 between the adjacent ends of each segment. These expansion loops form in effect a hinge upon which the respective segments work and render the ring yieldable, as a whole, in circumference. These joints or loops 9 permit the segments of the ring to be moved toward and away from each other without distortion of the ring circumference as a whole; that is, they permit expansion and contraction of the ring without causing its bearing face to take "an out of round" shape except when the cylinder wall surface is irregular and out of round. They provide in the complete ring, a continuous and unsplit member which is susceptible to variation in working diameter to provide the desired seal with the cylinder wall, and whereby the bearing surface is uniformly adjusted to the cylinder wall surface regardless of irregularities in either or both of these parts. Although, in the drawings, I have shown my ring as comprised of two identical half circle parts, yet it is to be understood that the two parts of the ring need not necessarily be half circle parts but may be so formed as to constitute a different proportional part of the complete circle, the main requirement being that the ring parts be capable of ready application to the annular space 4 to permit the same to be joined together to form the complete ring.

The ring sections, and consequently the rings as a whole, are provided with so-called pressure pads 10 (see Figs. 6, 7 and 6ª) which are formed integral with and extended interiorly of the ring, such pads being preferably located around the internal surface of the ring alternately of the adjacent expansion loops 9. The edge surfaces of the expansion loops 9 are finished the same as, and are formed flush with, the edges of the ring. One side of the pressure pads 10, as shown in Fig. 7, is, preferably, finished throughout, and is flush throughout its surface with the adjacent edge of the rings while the other side of the pad, as shown in Fig. 6, is not so finished but has only a small inwardly projecting portion 10ª thereof so finished and formed flush. The purpose of these pressure pads will be explained more fully hereinafter.

Each ring section is provided with an inwardly extending radial flange 11 and with an expansion loop 12 having one end formed integral with its section and the other end free for attachment to the mating ring part. These flanges 11 and the free ends of the loops 12 are provided with aligned openings. In joining these sections together they are arranged so that the flange of each section will abut and align with the free end of the loop 12 of the other section and after these sections are thus brought together a split bushing 13 is inserted in the aligned openings. The purpose of this split bushing is to permit the same to be forced into these openings to push the ring parts together and to hold the same in position so that the bearing surfaces and side edges of each section will properly align and remain in alignment at all times so that a true circle continuous ring is provided and maintained. After the split bushings have been inserted in place as stated suitable bolts 14 are passed therethrough; the heads of such bolts engaging a suitably provided lock washer 15 and their threaded portions engaging threaded openings in the flanges 11. In the preferred form, it will be noted that the split bushing 13 does not pass entirely through the flange 11 but engages a shoulder 11ª therein. I, however, do not desire to be limited to this specific construction of attachment because it is obvious that this connection may be made in various ways without departing from my invention, for example, as shown in Fig. 6ᶜ, wherein the split bushing 13ˣ passes entirely through the joined parts and the parts are held together by a bolt 14ˣ and nut 14ʸ. With both of these constructions the ring parts will always be properly aligned upon assembly, disassembly and re-assembly.

Figure 1:
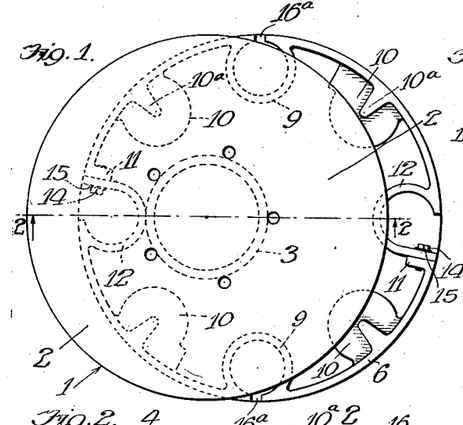
Fig. 1 is a top plan view of a preferred form of piston construction built in accordance with my invention. This view also shows the manner in which the piston rings may be applied to the piston.

The manner of installing these rings upon the piston is shown in Fig. 1. To install the rings, a ring section is inserted in the space 4 and moved so that either the flange 11 or loops 12 project beyond the outer part of the head and body portion. The space 4 is of sufficient depth to permit this. The other and mating ring part is then inserted in the space 4 with its flange or free loop end, as the case may be, projecting and aligning with the opening in the mating part of the other ring part, after which the split bushing 13 is inserted in the aligned openings. Or the bushing 13 may be inserted in one of the ring parts before the same is inserted in the space 4. In either event, after the bushing has been inserted, the bolt 14 is passed therethrough and engaged with the threaded opening in the flange 11 to securely fasten these ring parts together. Upon the completion of the foregoing, the ring parts are moved together to bring the other flange and free end loop to the outside and are fastened together as just explained. The foregoing steps are repeated with the next ring. In thus installing the rings 6 and 7, they are arranged in superimposed relation with the fully-finished faces of the pressure pads 10 turned toward each other (see Figs. 2 and 4). The rings are further adjusted in staggered relation so that the pressure pads of the upper ring lie over and span the loops 9 of the lower ring while the pads 10 of the lower ring lie under and span the loops 9 of the upper ring, these pads thereby serving to seal the loops of the respective rings. The pads of the lower ring also serve to support the loops of the upper ring and thereby hold the rings in a true horizontally aligned position relative to each other. Also, the pads of the lower ring in assuming the position stated relative to the loops of the upper ring prevent oil which may pass through the gaps 16ª of the upper ring from passing directly to the space 4 behind the rings so that there is always sufficient oil in the gaps 16ª to form an oil seal at that point. The rings are maintained in their staggered relation, above explained, by the spring member 17 or any other suitable means. This spring may be readily inserted in the position shown in Fig. 3 by moving the two rings to the position shown in Fig. 1.

In using my piston construction, for example, in connection with internal combustion engines, on the working strokes and when pressure is applied to the top of the piston, this pressure enters the chamber 4 behind the rings and is immediately equalized therein. The pressure immediately becomes effective upon the inner walls of the rings and expands them through the expansion loops 9 into an effective sealing engagement with the cylinder wall. It will be well understood that if a light pressure is acting upon the top of the piston, a lighter seal may effectively prevent the escape of such pressure past the same and, upon an increase in such pressure, a more effective and tighter seal may be desirable to prevent the escape of such pressure. With my invention when there is a light pressure above the piston and in chamber 4, the rings 6 and 7 are expanded to a corresponding extent to provide a correspondingly light but efficient seal; and as the pressure is increased the expansion of the rings is increased to provide a proportionately greater and tighter seal to provide a greater safeguard against the escape of the greater pressure past the ring. Obviously, unless otherwise provided for, this expansion tendency might become so great as to increase the frictional contact between the rings and the cylinder wall to such an extent as to injure the cylinder wall and moving parts, but my invention provides against such a condition. My rings are so formed that when the maximum point of expansion (or the safe limit of frictional engagement with the cylinder wall) is reached, and there is a tendency to exceed the same, the cylinder wall surface embracing the face of the ring restrains and compresses the ring segments, this being permitted by the yielding action of the segments about the expansion loops 9. In other words, the working diameter of the ring may be increased only to a point of maximum working sealing efficiency and when it tends to pass that point, the ring is restrained from further expansion, thus, maintaining the working diameter of the ring within predetermined limits. This not only positively prevents too great frictional engagement of the ring with the cylinder wall and the consequent injury thereto, but also provides for compensation for wear and insures a long life for the ring. As the ring wears and its normal diameter is decreased, it is nevertheless, during the operation of the piston, always expanded into the proper equalized sealing engagement with the cylinder wall. Still another advantage to be gained by this construction is that the yielding effect of the ring segments through the expansion loops enables the ring segments to accurately adjust themselves snugly in contact with the cylinder wall surface regardless of the irregularities in the cylinder wall surface, thereby providing a uniformly effective seal throughout such surface. The expansion joints or loops 9 also take care of excessive expansion of the rings due to heat conditions existing in the cylinder by closing the gaps 16$^a$.

When pressure is applied to the top of the piston and is effective in the chamber 4, it acts directly upon the tops of the pads 10 of the upper ring. The clearance of the head portion from the cylinder wall is also such as to permit some of the pressure applied to the top thereof to pass the head edges and pass through the gaps 16$^a$ of the upper ring and become effective through the loops 9 of the upper ring upon the pads of the lower ring. When this pressure acts on the pads on the upper ring covering the loops on the lower ring, and vice versa, the two rings are firmly forced and sealed together and the bottom ring is firmly forced and sealed against the top of the piston body. This prevents escape of pressure from behind the rings through the lower expansion loops and past the lower ring seat and also aids in the conduction of heat from the head and body of the piston to the cylinder wall and the water cooled jacket (not shown). More particularly the rings are moved against the piston body with such force by the pressure acting on the pads that oil, which may be between the bottom 11 that oil, which may be between the bottom ring and the body, is practically forced out and a rather close contact between the metal parts results permitting a practically unobstructed flow of the heat from the head 2 through the supporting post 3 into the piston body 1 and thence through the rings to the cylinder wall and water cooled jacket. This provides for the proper and desired cooling and uniform heat stabilization of the working parts, thereby overcoming the tendency for overheating of the piston as in connection with the use of ordinary rings.

Another advantage of the inwardly extending expansion loops and pressure pads is that they extend close to the central portion of the head part 2 where the heat is intense and they aid in conducting the heat from the head to the rings and the water cooled jacket above referred to.

My invention is also such that side edge wear of the rings is reduced to a minimum. It will be noted that the expansion loops provide additional side edge bearing surface and that the inwardly extending portions 10$^a$ of the pads also provide additional side edge bearing surface. This increased edge bearing surface tends to give the ring a longer life by prolonging the wearing away of the edge surfaces thereof so that it will operate for a greater length of time without becoming excessively loose in the space 4. Fig. 6$^b$ shows a modified form of pressure pad. In this modified form the pad is provided with still further bearing surface by the addition of the portion 10$^b$ which is finished flush with the top of the portion 10$^a$ (Fig. 6$^a$) and flush with the adjacent side edge of the ring. Otherwise this modified pad is the same as that shown in Fig. 6$^a$. If desired, the portion 10$^a$ could be dispensed with and the portion 10$^b$ used alone; or the portion 10$^a$ could be extended throughout the pad surface.

Figure 3:
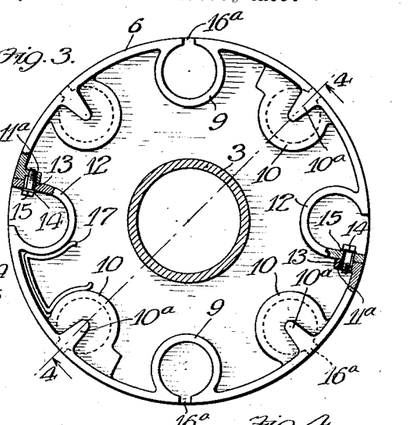
Fig. 3 is a horizontal sectional view taken at the position indicated by the line 3—3 of Fig. 2.
Figure 8:
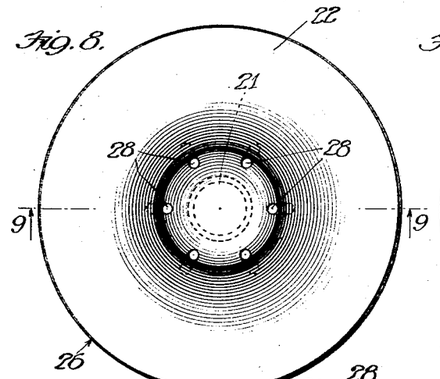
Fig. 8 is a top plan view of a modified form of piston construction embodying my invention.
Figure 9:
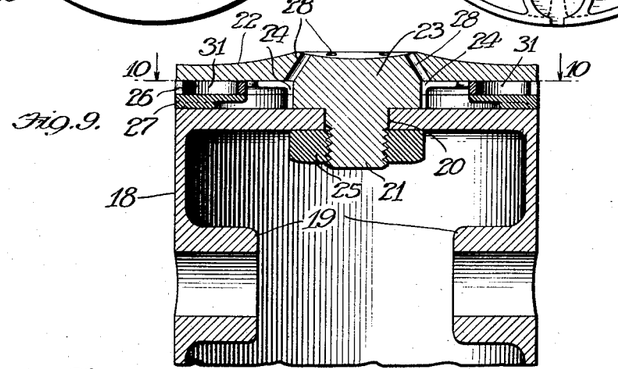
Fig. 9 is a vertical sectional view taken on line 9—9 of Fig. 8.
Figure 10:
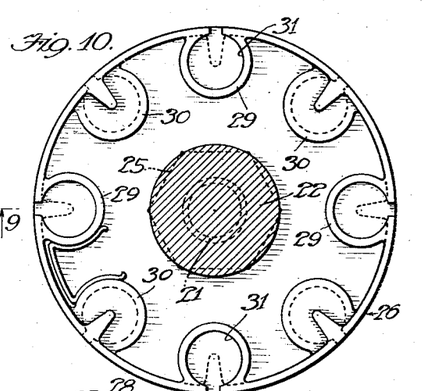
Fig. 10 is a horizontal sectional view taken at the position indicated by the line 10—10 of Fig. 9.
Figure 11:
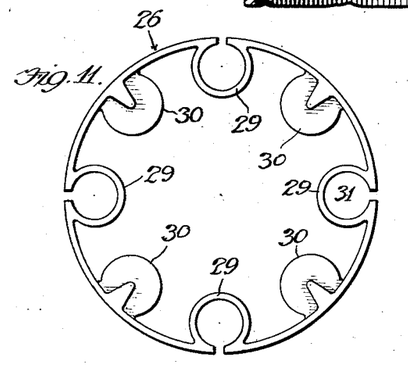
Figure 12:
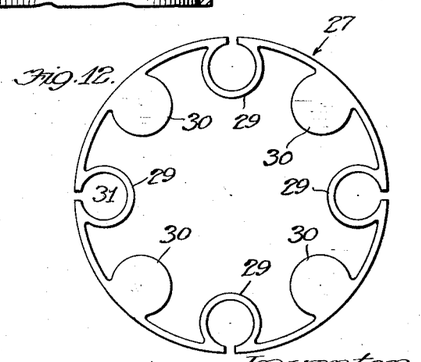

With the rings in place in the space 4, the arrangement of the pads 11 and loops 10 in their alternate positions, as explained and clearly shown in Figs. 2, 3, and 4, provides oil pockets 16 between the rings and their respective contacting surfaces. These oil pockets are in communication with the cylinder wall surface through the gaps 16$^a$ of the ring face. Oil from the cylinder wall surface may enter the pockets 16 through the gaps 16$^a$. It is my assumption that when the piston is under compression and pressure is acting in the space 4, these pockets are sealed and any oil therein is trapped; but, when the piston is not under compression and pressure is not effective in the space 4 and the rings are in a sense unseated, the pockets are not sealed and they are drainable so that during operation there is, in effect, a surging of oil through the oil pockets. The result of this is that, although the gaps 16 are at all times oil sealed, the oil pockets are being repeatedly flushed whereby the accumulation of carbon deposit therein and around the rings is prevented. If desired, the oil which may collect in the oil pockets formed in the loops of the lower ring may be carried away into the crank case of the engine by drilling a hole through the top of the body portion immediately beneath each loop of the lower ring, in which event, means should be provided for maintaining the rings in the same circumferential position at all times.

The operation of my invention will be apparent from the foregoing description. The working pressure acting on the top of the piston is utilized to control the seal between the piston and cylinder in a manner which provides for maximum efficiency under all working conditions. When pressure is removed from the piston, the rings assume their normal working diameter which is sufficient together with the oil film on the cylinder wall to provide the desired seal under such working conditions. Heat generated during operation is readily conducted to the head portion, body portion and rings, to the water cooled cylinder, and through the body and connecting rod to the cooler parts of the engine.

In Figs. 8 to 12 inclusive of the drawings a modified form of my invention is shown, which includes a piston body 18 formed as a separate unit with its top portion closed except for the opening 20 which is adapted to receive a downwardly depending threaded portion 21 of a removable head 22. This threaded portion is part of an enlarged stem which is integral with and adapted to carry the head 23 upon the body 18. The stem is of sufficient length to provide a suitable ring space 24 between the head and body, this ring space being adapted to receive two rings in superimposed relation as in connection with the preferred form of Figs. 1 to 7. A locking nut 25 is engaged with the threaded end 21 of the stem to securely tie the head and body together.

Each of the rings 26 and 27 (Figs. 11 and 12) comprises a continuous uncut band of metal which has its side edges and bearing face finished in the ordinary manner. Each ring is divided into a plurality of integrally joined segments by looping the band inwardly at regular intervals throughout the circumference of the ring to form a segmental bearing face with an expansion joint 29 between the adjacent ends of each segment; and each ring is also provided with pressure pads 30 which are similar to the pressure pads 10 of the structure of Figs. 1 to 7. In fact, the piston constructions of Figs. 1 to 7 and Figs. 8 to 12 are substantially the same except that in the latter construction a removable head and uncut rings are employed whereas in the former construction the head is fixed to the body and the rings, while continuous, are formed of a plurality of parts securely joined together. The operation is the same as that of the preferred form.

Figure 13:
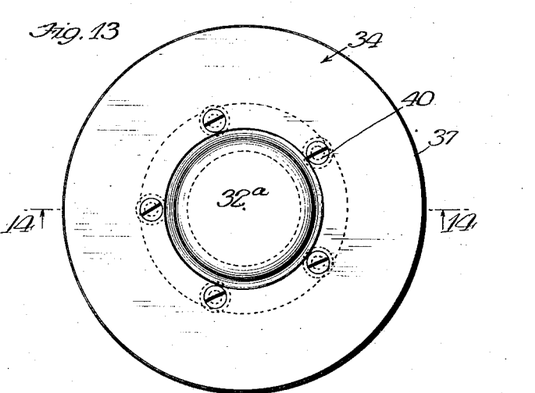
Fig. 13 is a top plan view of another modified form of piston construction embodying my invention.
Figure 14:
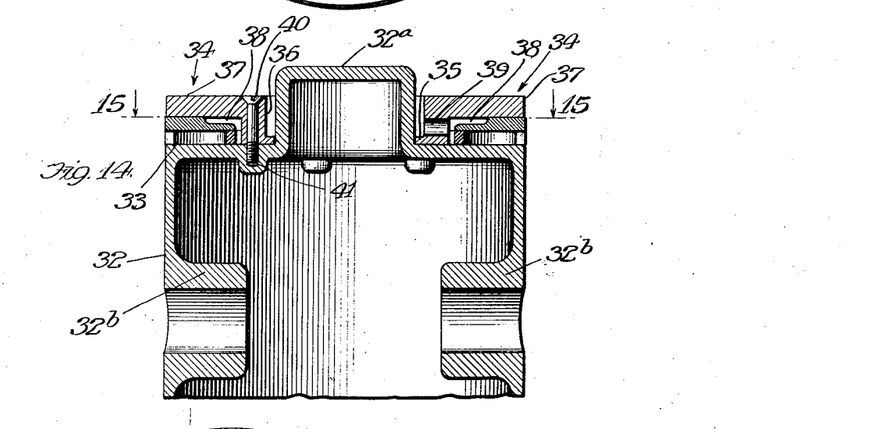
Fig. 14 is a vertical sectional view taken on line 14—14 of Fig. 13.
Figure 15:
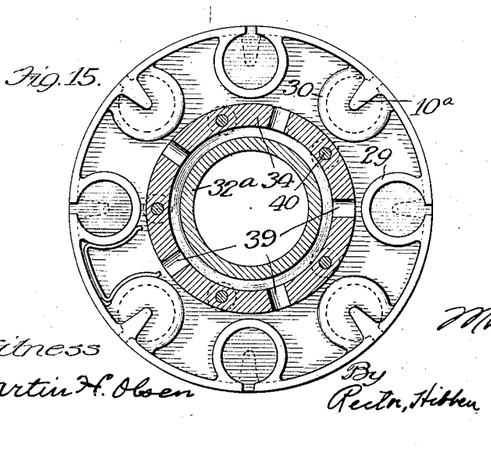
Fig. 15 is a horizontal sectional view taken at the position indicated by line 15—15 of Fig. 14.

In Figs. 13 to 15 a further modification is shown which comprises a body 32 with the usual inwardly projecting bosses 33$^b$ for carrying the connecting rod pin. The top of the piston is closed and is formed with an integral and central upstanding portion 32$^a$ which provides a ring ledge 33 at the top of the piston.

A plurality of rings, preferably two, (Fig. 15) are mounted on the ring ledge 33 and are held in place thereon by cup-shaped retaining member 34. These rings are identical in construction and operation with the rings 26 and 27 of the form of Figs. 8 to 12 and need no further description.

The cup shaped retaining member may be formed of any suitable metal and may comprise a base 35 having an opening to permit the member to be passed down over projection 32$^a$. A thick and sturdy circular wall 36 extends upwardly from the base 35, this wall having a horizontal flange 37 which extends out over the piston ledge 33 to form therebetween a ring and pressure space 38. The vertical wall 36 is provided with a plurality of circumferentially disposed openings 39. This retaining member is held in position upon the head by a plurality of screws 40 passed through suitable openings in the vertical wall 36 (see Figs. 13 and 14) and engaging a suitable threaded opening 41 in the piston ledge 33. It will be noted that the opening 41 does not pass entirely through the ledge 33 so that there is no possibility of leakage at that point. The vertical wall 36 is spaced from the piston portion 32$^a$ to permit pressure on top of the piston to readily enter the openings 39 and space 38 behind the rings. The upstanding portion 32$^a$ of the body projects above the member 34 to an extent sufficient to compensate for the space between such member and upstanding portion so as to not disturb the usual piston displacement.

Further construction and operation of this form of my invention is the same as that of the forms of Figs. 1 to 12.

While I have shown in the drawings three forms of embodiment of my invention, it will be obvious that still further changes and modifications may be made without departing from the scope or spirit of my invention as defined in the claims which follow.

I claim:

1. In a piston construction, a body portion having its top closed; a head portion integral with said body and having its outer part spaced therefrom to form a space therebetween; a plurality of rings interposed in and occupying only a part of said space, each of said rings comprising continuously joined pieces of metal having its outer surface looped inwardly at regular intervals to provide positively for variation in the working diameter of the ring by expansion and contraction; a plurality of projections extending inwardly from the side edges of each ring into said space and arranged alternately with said looped portions, said projections being substantially of the same size and shape as said looped portions and having one side finished throughout flush with the adjacent side edge of the ring and the other side only partially finished flush with said side edge, said rings being superimposed in said space with the full finished faces of said extensions of one ring spanning the looped portion of the other ring and with the other and partially finished surfaces engaging the head and body portion respectively; means carried by said rings for preventing relative movement of the same from said superimposed position; and small openings in said head portion for admitting working pressure to said space behind said rings to expand the same against the wall of the cylinder in which the piston operates.

2. In a piston construction, a body portion having a closed top, a ring retaining portion integral with said body and having an opening therein and having a portion spaced from said body portion to form a ring and pressure space therebetween, a continuous ring having detachable sections, said ring as a whole being expansible and contractible without breaking its continuity for effecting a variable sealing engagement between the piston body and the wall of the cylinder in which it works, said variable sealing engagement being effected by admission of working pressure through said opening into said space behind the ring.

3. A piston ring comprised of a plurality of parts detachably joined to form a continuous ring, each of said parts being identical and being looped inwardly at intervals to form a segmental bearing surface, said looped portions acting as flexible joints between said segments, and some of said loops being provided with means permitting of attachment of said ring parts.

4. A piston ring comprised of a plurality of parts detachably joined to form a continuous ring, each of said parts being identical and being looped inwardly at intervals to form a segmental bearing surface, said looped portions acting as flexible joints between said segments and each of said parts having their side edges extended inwardly, but to a different extent on opposite sides, at intervals and alternately with said looped portions to increase the side edge bearing surface of the ring as a whole.

5. In a piston the combination of a piston body, a head integral with said body and spaced therefrom, a piston ring carried in said space, said ring comprising a plurality of parts each having mating joints adapted to be rigidly joined together to form a continuous ring when assembled, said ring being assembled on said piston by inserting each of said parts in said space individually, and fastening devices applied to said parts for rigidly joining the same together.

6. In a piston construction, a piston body, a piston head, an upstanding and centrally disposed post member integral with said head and body for carrying and spacing the head from the body, a continuous band piston ring adapted to be assembled in said space, said ring being formed of circumferential parts having mating joint surfaces, said ring parts being adapted to be assembled separately in said space and then joined together to form a true circle continuous ring, and means engaging said joints for rigidly fastening said parts together.

7. In a piston, a piston body, a central upstanding post member integrally carried by said body, a piston head integrally carried by said post, said post also serving to space said head and body to form a ring and pressure space therebetween, two superimposed rings carried in said space, each of said rings comprising a plurality of separable ring sections each having mating joint parts and means engaging said joint parts of adjacent sections, for rigidly securing said sections together, the arrangement being such that said sections may be placed in said space in separated condition and then joined together by said securing means to form a continuous true-circle unsplit ring.

8. A piston ring comprised of a plurality of sections, flexible joint parts for continuously and fixedly joining said sections, the side edges of said sections being extended inwardly at intervals between said joint parts, the opposite side edges being extended to different extents.

9. In a piston, the combination of a body, a head integrally carried by said body and having its outer edge spaced therefrom to form a ring and pressure space, a ring mounted in the outer part of said space, said ring having a continuously joined sealing surface adapted to seal against the wall of the cylinder, and bearing surfaces extended inwardly from the side edges of said ring at intervals around its circumference, the bearing surfaces on the opposite sides being of different size.

10. In a piston, the combination of a body, a head integral with said body and having its outer part spaced therefrom, a pair of rings snugly mounted upon each other in the space between the head and body, each said ring being of the same size and shape and having a plurality of sections all joined together by inwardly extending flexible loop-joints, circular pads extending inwardly from said ring and having one face fully finished and flush with that side edge so as to seat upon the loop-joints of the other ring, said pads having only a part of their other side edge finished and flush with the other side edge of the ring to seat upon the adjacent edge wall surface of said space, and means for admitting pressure from the top of the piston into said space where it acts upon said ring.

In testimony whereof, I have subscribed my name.

MACY O. TEETOR.